United States Patent [19]

Lagree et al.

[11] Patent Number: 4,776,433

[45] Date of Patent: Oct. 11, 1988

[54] ELEVATOR DOOR CONTROL SYSTEM

[75] Inventors: James L. Lagree, Plum Borough; Richard A. Johnson, Murrysville; Dirk J. Boomgaard, Monroeville, all of Pa.; Daphne C. D'Zurko, Parsippany, N.J.

[73] Assignee: Westinghouse Electric Corp., Pittsburgh, Pa.

[21] Appl. No.: 148,394

[22] Filed: Jan. 25, 1988

[51] Int. Cl.[4] ............................................. B66B 13/08
[52] U.S. Cl. ..................................... 187/103; 187/104
[58] Field of Search ................. 187/103, 104; 318/257

[56] References Cited

U.S. PATENT DOCUMENTS

| | | | |
|---|---|---|---|
| 3,376,486 | 4/1968 | Caputo | 318/257 |
| 4,299,308 | 11/1981 | Shung et al. | 187/103 |
| 4,300,660 | 11/1981 | Schoenmann et al. | 187/103 |
| 4,300,661 | 11/1981 | Hmelovsky | 187/103 |
| 4,300,662 | 11/1981 | Hmelovsky | 187/103 |
| 4,300,663 | 11/1981 | Hmelovsky et al. | 187/103 |
| 4,305,480 | 12/1981 | Hmelovsky | 187/103 |
| 4,305,481 | 12/1981 | Hmelovsky et al. | 187/103 |
| 4,342,378 | 8/1982 | Hmelovsky | 187/103 |
| 4,342,379 | 8/1982 | Games et al. | 187/103 |
| 4,567,411 | 1/1986 | Reimann et al. | 187/103 |

Primary Examiner—William M. Shoop, Jr.
Assistant Examiner—W. E. Duncanson, Jr.
Attorney, Agent, or Firm—D. R. Lackey

[57] ABSTRACT

A feedback controlled elevator door control system 30 having motoring and generating modes, including a DC motor 35 connected to a DC power supply 36 via a power bridge circuit 68. Protective features include a dynamic current limit reference 200 having a magnitude which changes with motor speed; control 116 for providing an object detection safety-stop speed pattern having parameters which are selectable independent of the door stopping portions of normal opening and closing speed patterns; a bridge monitor 66 which prevents the changing of door commands when motor reversal could cause a bridge short; a power supply monitor 40 which blocks door commands when the control voltage is below standard; and an over-voltage protection monitor 38 which protects against excessive voltage build-up on DC power supply components when the bridge circuit 68 pumps power back to the DC power supply 36 during a generating mode.

15 Claims, 11 Drawing Sheets

ELEVATOR DOOR CONTROL SYSTEM

TECHNICAL FIELD

The invention relates generally to elevator door control systems, and more specifically to protective features for protecting such door control systems from undue mechanical stresses and excessive voltages while operating associated elevator car and hatchway doors between open and closed positions.

BACKGROUND ART

The operation of elevator car and hatchway doors is subject to several conflicting constraints. In the interest of providing efficient elevator service, the doors must open and close in as short a time as practical. In the interest of esthetics, as well as in protecting the mechanical portions of a door operator and associated car and hoistway doors, the doors must operate smoothly and noiselessly without generating undue shock forces in the door operator arms, linkages, and the like. In the interest of safety, the doors must stop quickly when an obstruction is detected in the path of closing doors, with the kinetic energy of the doors and parts rigidly connected thereto being limited by applicable elevator codes.

Closed loop feedback servo control of the elevator doors in which door speed is forced to follow a speed pattern can provide the desired fast, smooth and quiet operation, if the control is properly safeguarded against operation which will unduly stress the control elements mechanically and electrically. The present invention is directed to these protective aspects of elevator door control.

DISCLOSURE OF THE INVENTION

Briefly, the present invention is a new and improved feedback controlled elevator door control system having a plurality of protective features which are cooperatively integrated to enable the door control system to provide smooth, fast, noiseless operation without exceeding applicable elevator code requirements relative to kinetic energy. The door control generates opening and closing speed patterns, as required, and the door speed is forced to follow the pattern being generated. A DC motor in the door operator operates in motoring and generating modes, as required to follow the speed pattern. The DC power supply is pulse width modulated (PWM) and applied to the motor armature via a power bridge circuit which enables the current direction through the armature to be reversed. When the motor speed is less than the speed pattern the DC motor is operated in a motoring mode, and when the motor speed exceeds the speed pattern, the motor operates in a generating mode which dynamically brakes the motor.

A first protective aspect of the invention relates to limiting the motor current. The motor current limits upon opening and closing of the doors are different, and each are independently selectable. In addition, instead of having a static current reference, the current reference is dynamic, increasing with motor speed. The dynamic current reference eliminates the need for making a compromise on the value of the current reference, enabling a relatively low and thus sensitive current limit at low motor speeds, without adversely affecting the ability to momentarily operate at higher speeds for faster overall door performance times.

The open and close command signals from the door control are monitored relative to the condition of the power supply, and relative to the condition of the power bridge circuit. While the control strategy may call for the doors to be opened or closed, the applicable command signals are blocked from the speed pattern logic if the power supply control voltage is below a predetermined reference value. Also, the control strategy may call for a change in motor direction. Such commands are blocked, however, until the power bridge circuit may be safely switched to reverse the polarity of the drive voltage applied to the motor without danger of shoot-through, i.e., bridge short circuit.

The power bridge circuit is controlled to allow the DC motor to function as a generator when its speed exceeds the value of the speed pattern, pumping energy back into the DC power supply to dynamically brake the motor until motor and pattern speed are again in the desired range. A protective circuit monitors the voltage of the power supply capacitors, connecting a crow-bar resistor across the output terminals of the power supply in the event the capacitor voltage reaches a predetermined reference value.

The doors, when closing, are stopped when an object is detected in the closing path. The object detector, for example, may be a mechanical safety edge on the leading edge of the closing car door panel, or panels, or the object detector may be optical, acoustic, capacitive, and the like, or combinations thereof. Using the normal slowdown pattern, i.e., the pattern used to control door speed as the doors approach the fully closed position, may not be suitable for an object detection stop, and simply dynamically braking the motor without control may apply damaging forces to the door operator linkages, as well as causing objectionable noise and vibration. The present invention enables a desired object detection stopping pattern to be selected, by providing independent slope control for an object detection stop.

A plurality of different speed levels are selectable, which may be different for door closing than for door opening, if desired, without interaction between the circuits which select and produce the speed levels, by decoding door commands and door position inputs with a multiplexer. The multiplexer selects and connects a predetermined, pre-set potentiometer to the speed pattern control according to pattern speed level, door position, and the presently effective door command.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
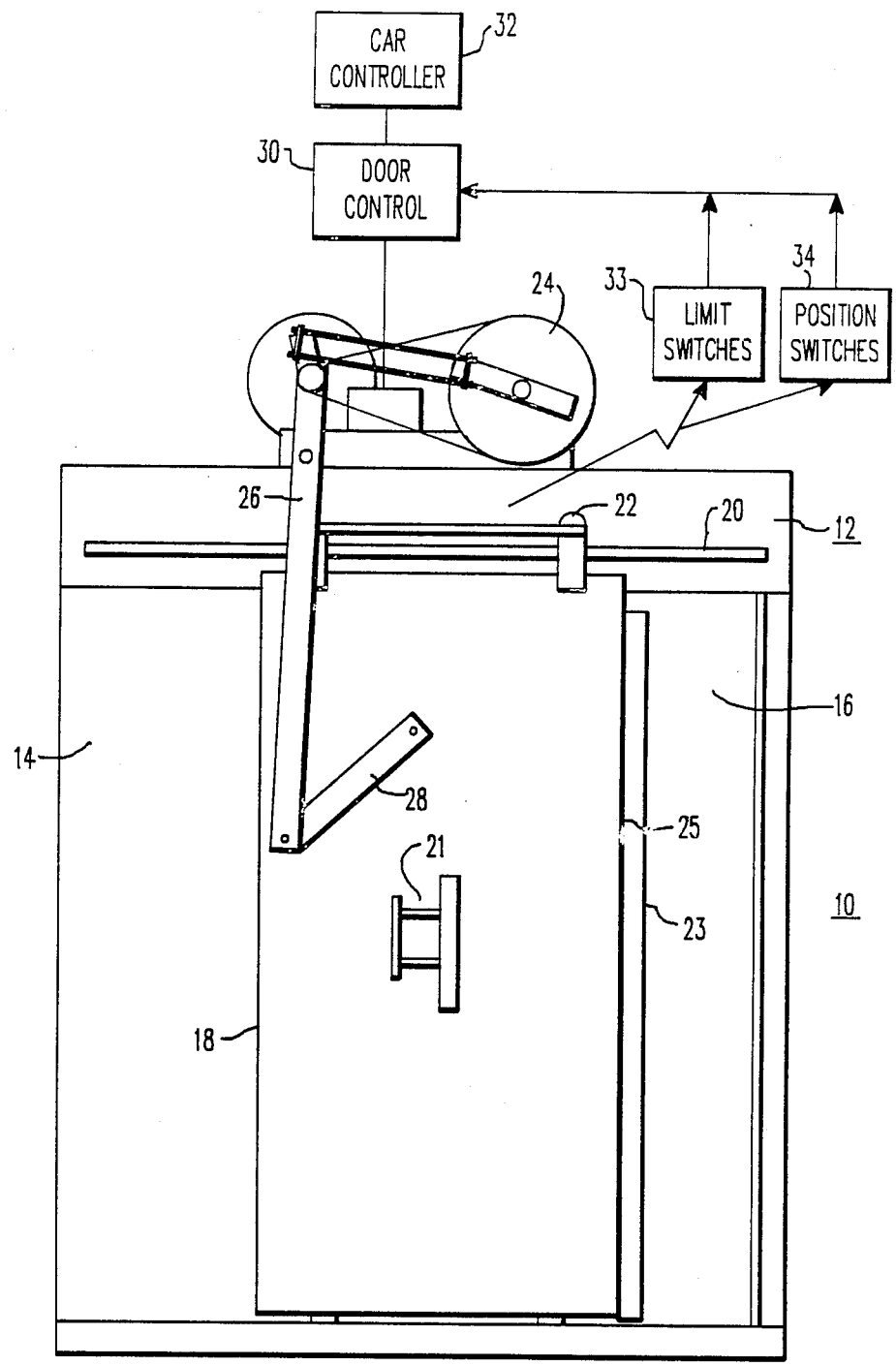
FIG. 1 is an elevational view of an elevator car having a door operator, a car door, and object detector, the control of which may be constructed according to the teachings of the invention.

Referring now to the drawings, and to FIG. 1 in particular, there is shown an elevator car 10. Car 10 is mounted for guided vertical movement in the hatch of a building (not shown), with the motive means for car 10 being a traction drive arrangement, or a hydraulic jack, as desired. Car 10 includes a cab 12 having a front portion 14 which defines an opening 16 closable by a car door 18. Car door 18 is mounted for linear rolling movement across the front 14 of cab 12 via a hanger track 20 on the cab 12 and a hanger roller assembly 22 on door 18. Door 18 includes a clutch and vane drive assembly 21 for engaging and driving hatch doors (not shown) associated with a hatch door entrance in the associated building. Door 18 also includes an object detector for detecting the presence of an object in the closing path, such as a mechanically operated safety edge 23 mounted on the leading edge 25 of door 18. Safety edge 23 operates an electrical switch when actuated, which switch provides a signal for door control 30. U.S. Pat. No. 3,627,082 may be referred to for more detailed information on safety edge construction.

A door operator 24 is mounted on cab 12 and it is operatively linked to door 18 via linkages 26 and 28. Door operator 24 is controlled by door control 30, which in turn receives supervisory commands from a car controller 32, door limit signals from door limit switches 33, and intermediate door position signals from door position switches 34.

Exemplary car control 32 for providing door commands is shown in U.S. Pat. Nos. 3,750,850 and 4,436,184, and door limit and door position switches 33 and 34 for providing signals when door 18 reaches predetermined positions during opening and closing are shown in U.S. Pat. No. 4,004,655. The aforementioned patents, all of which are assigned to the same assignee as the present application, are hereby incorporated into the specification of the present application by reference.

While FIG. 1 illustrates a single-speed, side-opening door 18, i.e., a door having a single side opening panel, it is to be understood that the invention is equally applicable to two speed side opening doors, and to single and two speed center opening doors.

Figure 2:
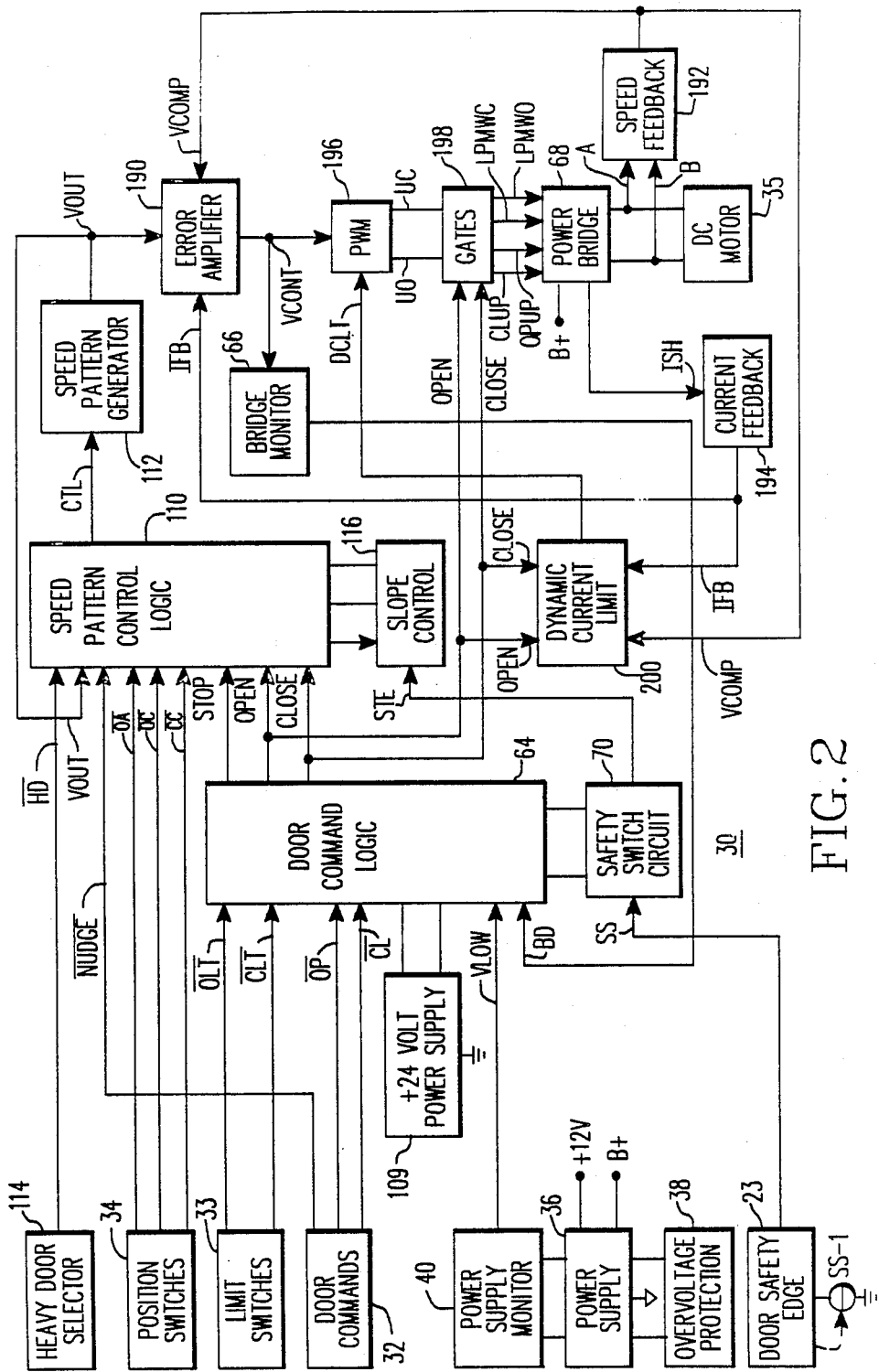
FIG. 2 is a functional block diagram which illustrates the protective features of the invention.

Referring now to the functional block diagram of FIG. 2, door operator 24 includes a DC drive motor 35, such as a PM motor. Door control 30 includes a power supply 36 which provides B+ for drive motor 35 and the necessary regulated control voltage for the various circuits which make up control 30, such as +12 volts.

An overvoltage protection function 38 monitors B+ and if B+ exceeds a predetermined value, function 38 connects a suitable impedance across the B+ output. A power supply monitoring function 40 monitors the control voltage and if it falls below a predetermined value, a monitoring signal VLOW switches from a logic zero to a logic one.

Figure 3:
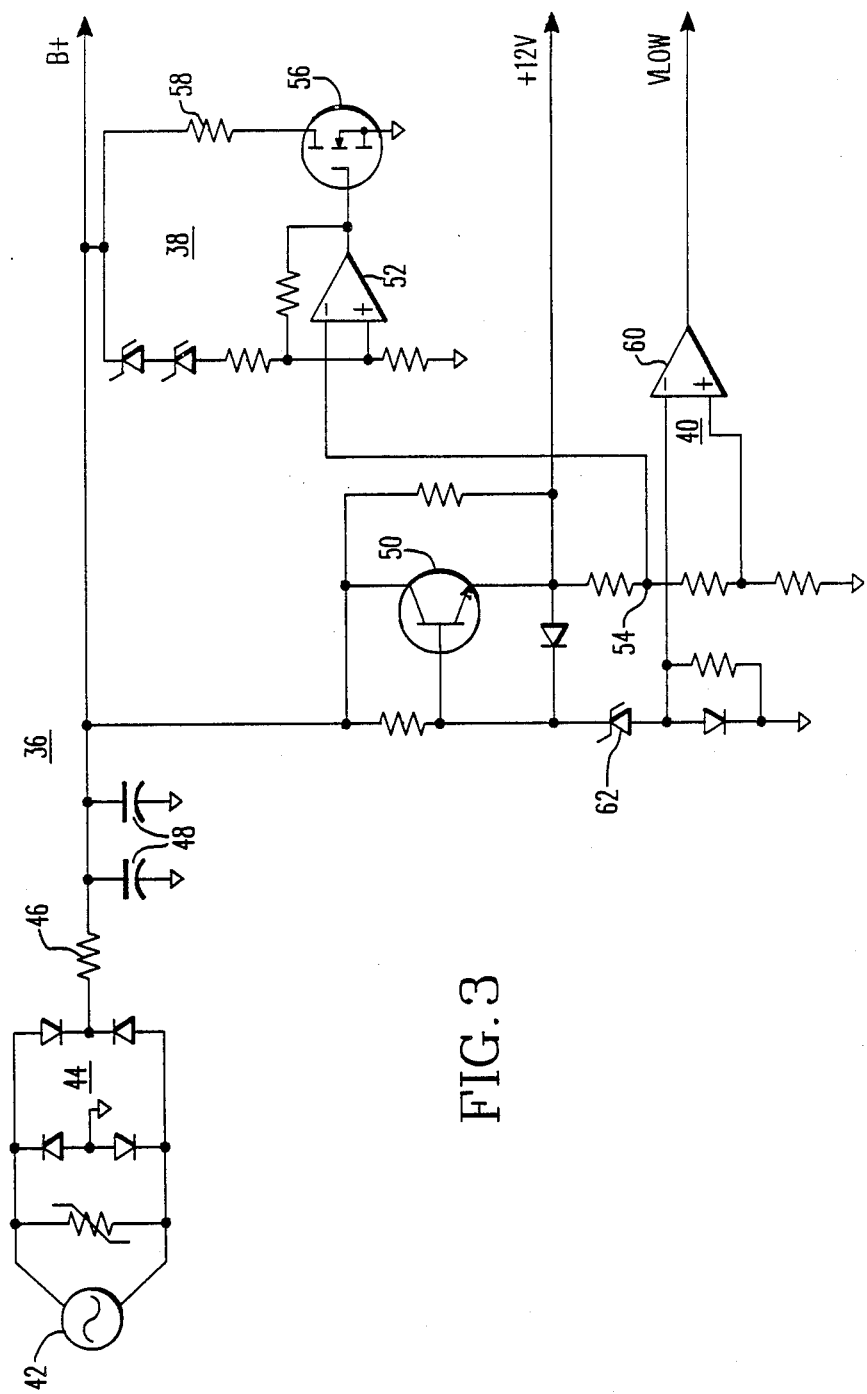
FIG. 3 is a schematic diagram of a power supply and power supply monitoring functions which may be used for these functions shown in block form in FIG. 2.

FIG. 3 is a detailed schematic diagram of the power supply related functions. A source 42 of alternating potential is converted to B+ via a bridge rectifier 44, resistor 46 and capacitors 48. A series regulator function which includes a properly heat sinked NPN junction transistor 50 provides a regulated control voltage of +12 volts.

The B+ monitoring function 38 includes an operational amplifier (op amp) 52 which compares a voltage proportional to B+ with a regulated voltage developed by voltage divider 54. If B+ exceeds a predetermined value, the output of op amp 52 switches positive and turns on a solid state switch in the form of MOSFET 56, connecting "crowbar" resistor 58 from B+ to ground. As will be pointed out, power supply 36 may receive energy from the door operator's drive motor 35 when motor 35 is operated in a generating mode, causing the voltage on capacitors 48 to rise. Circuit 38 insures that the voltage on capacitors 48 will not exceed their safe operating level.

The control-voltage monitoring function 40 includes an op amp 60. A 12 volt Zener diode 62 holds signal VLOW at logic zero as long as the control voltage is at the regulated value. If the control voltage should drop below the recovery value of Zener 62, the voltage at the inverting input of op amp 60 will drop below the voltage applied to the non-inverting input from voltage divider 54 and op amp 60 will switch its output VLOW to a logic one.

Returning now to FIG. 2, a door command logic function 64 receives door open and door close commands $\overline{OP}$ and $\overline{CL}$, respectively, from a door command function associated with car controller 32, and logic function 64 decides if the specific command received from command function 32 should be allowed to proceed beyond that point to the remaining portion of the control circuitry. Commands $\overline{OP}$ and $\overline{CL}$ may be provided by switches or contacts OP-1 and CL-1 (FIG. 4) which are normally open and which close to conduct direct current from the signal conductor to a power supply return, to signify a true state or true command. If logic function 64 decides that a true door open command $\overline{OP}$ should be allowed to proceed, logic function 64 outputs a true (logic one) signal OPEN; if logic function 64 decides that a true door open command $\overline{CL}$ should be allowed to proceed, logic function 64 outputs a true signal CLOSE; and if logic function 64 decides that neither a true OPEN signal nor a true CLOSE signal should be provided, a true signal STOP is output, indicating that the door drive motor 35 should be stopped.

Logic function 64 additionally obtains inputs $\overline{OLT}$ and $\overline{CLT}$ from the door limit switches 33. Similar to signals $\overline{OP}$ and $\overline{CL}$, a true state for signals $\overline{OLT}$ and $\overline{CLT}$ may be indicated by a contact closures of contacts OLT-1 and CLT-1, respectively, (FIG. 4) which conduct current from the signal conductor to a power supply return. Input signal $\overline{OLT}$ is provided by a door-open limit switch OLT-1, with switch OLT-1 closing and signal $\overline{OLT}$ going true when the door 18 is opening and it reaches a point where a door opening speed pattern should be adjusted to bring the door speed to zero as the door 18 reaches its maximum open position. Signal $\overline{CLT}$ is provided by a door-close limit switch CLT-1, with switch CLT-1 closing and signal $\overline{CLT}$ going true when the door 18 is closing and it reaches a point where a door closing speed pattern should be adjusted to bring the door speed to zero as the door 18 reaches its fully closed position.

Logic function 64 is also responsive to signal VLOW from power supply monitor 40, and a signal BD from a monitoring function 66 associated with the condition of a power bridge. As will be hereinafter explained, monitoring function 66 provides a true or logic one signal BD when a power bridge 68 connected to motor 35 may be switched to change the direction of current flow through motor 35 without danger of bridge shoot-through. Logic function 64 will not provide true signals OPEN or CLOSE when signal VLOW is high, indicating low control voltage, or when signal BD is low, indicating power bridge 68 is not in condition to reverse the polarity of the voltage applied to the motor 35.

Door command logic 64 is associated with a safety switch circuit function 70. Safety switch function 70 is responsive to the object detection function, which in the exemplary embodiment is provided by door safety edge 23 and an associated safety edge switch or contact SS-1 which provides a signal SS. When the door safety edge 23 is not actuated safety edge contact SS-1 is closed, enabling current flow to a power supply return, and when the safety edge 23 is actuated by an object in the closing path of door 18, safety edge contact SS-1 opens and current ceases. Safety switch circuit 70 provides an output signal STE which follows the condition of safety edge contact SS-1 in the absence of a true signal OPEN, with signal STE being a logic one when safety edge 23 is actuated (contact SS-1 is open), and a logic zero when safety edge 23 is not actuated (contact SS-1 is closed). Safety switch circuit 70 also prevents door command logic from outputting a true signal CLOSE when the door safety edge 23 is actuated.

Figure 4:
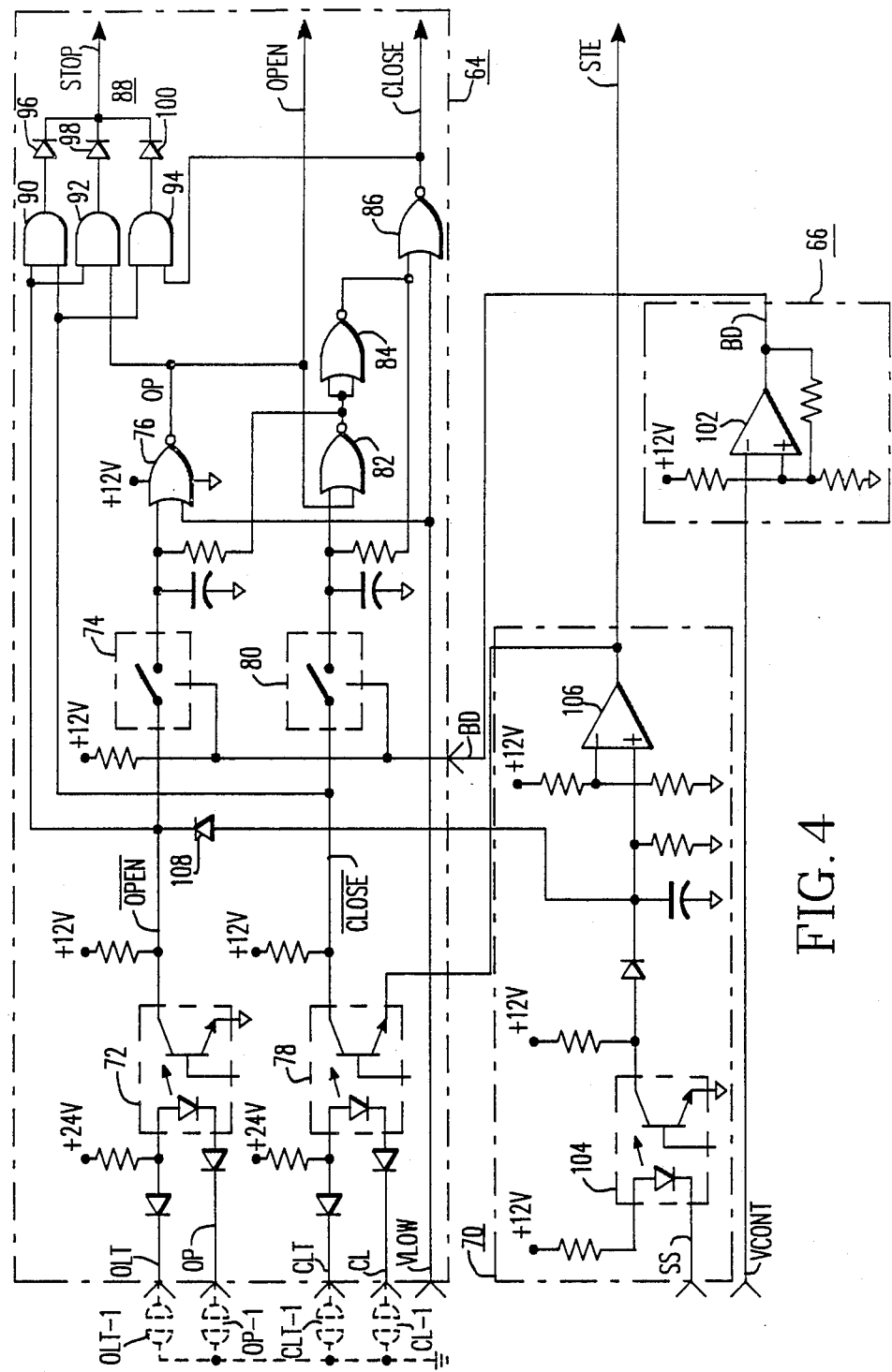
FIG. 4 is a schematic diagram of door command logic, a bridge detector function, and a safety edge circuit, which may be used for these functions shown in block form in FIG. 2.

FIG. 4 is a detailed schematic of the door command logic function 64, the bridge condition detector function 66, and the safety switch circuit function 70. The logic function which produces signal OPEN includes an opto-coupler 72, a bilateral switch 74, such as RCA's CD4066, and a NOR gate 76. The logic function which produces signal CLOSE includes an opto-coupler 78, a bilateral switch 80 and NOR gates 82, 84 and 86. The logic function which produces signal STOP includes an auctioneering circuit 88 comprising AND gates 90, 92 and 94 and diodes 96, 98 and 100.

The condition of power bridge 68 is sensed by detecting the level of a control signal VCONT which controls the power bridge. Control signal VCONT is level compared with a reference voltage in an op amp 102. If VCONT is below the reference voltage it indicates power bridge 68 may be safely switched to reverse the voltage applied to motor 35, with function 66 providing a high or true signal BD. If VCONT exceeds the reference voltage, the output of op amp 102 and signal BD will be low, indicating voltage direction should not be reversed.

The safety switch circuit function 70 includes an opto-coupler 104 and an op amp 106 connected as a comparator. The output of opto-coupler 104 is connected to be responsive to the output of opto-coupler 72 via a diode 108, and opto-coupler 78 is connected to be responsive to the output of op amp 106. When the door safety edge 23 is not actuated the safety edge contact SS-1 is closed, providing a current path to the return of a +24 volt supply 109 (FIG. 2) connected to an LED in opto-coupler 104, and opto-coupler 104 is "on". The non-inverting input of op amp 106 is lower than the inverting input, and the output of op amp 106, signal STE, is low. When safety edge 23 is actuated, safety edge contact SS-1 opens, opto-coupler 104 turns "off", and if there is no true OPEN signal, as detected by diode 108, the non-inverting input of op amp 106 will be higher than the inverting input and the output of op amp 106, and signal STE, will be high.

In the absence of an open command, contact OP-1 will be open, opto-coupler 72 will be "off", and the output of opto-coupler 72, which is applied to an input of switch 74, will be high. Switch 74 has its control element connected to receive signal BD. If the power bridge 68 is in a condition which will safely allow motor voltage direction to be reversed, signal BD will be high, closing switch 74 to apply the high signal to an input of NOR gate 76. The output of NOR gate 76 will thus be low, providing a low signal OPEN. If signal BD is low, switch 74 will block a true open command. If the output of power supply 36 is below the desired value, signal VLOW will be high, and the output of NOR gate 76 will be forced low, regardless of the condition of the open request contact OP-1.

When the opening door 18 reaches open limit switch OLT-1, switch OLT-1 closes to ground the input to opto-coupler 72, turning it off, and signal OPEN switches low.

The circuitry associated with the door closing function operates similar to that described for the door opening function, except the emitter of the transistor of opto-coupler 78 is connected to the output of op amp 106, preventing a true CLOSE signal from being generated while the safety edge 23 is actuated. Also, a true OPEN signal forces signal CLOSE low by virtue of the output of NOR gate 76 being connected to an input of NOR gate 82.

When the closing door reaches the close limit switch CLT-1, switch CLT-1 closes, turning opto-coupler 78 off, and forcing signal CLOSE to a logic zero.

If there is no true OPEN or CLOSE request, at least one of the AND gates 90, 92 or 94 will produce a logic one, and signal STOP will be true. The AND gates 90, 92 and 94 also check for malfunctions in the bilateral switches and NOR gates, by comparing commands on both sides thereof.

Returning now to FIG. 2, door control 30 includes a speed pattern control logic function 110. Control function 110 provides an output CTL which controls a speed pattern generator 112. Control function 110 is responsive to the signals STOP, OPEN, and CLOSE provided by the door command logic function 64. Control function 110 is also responsive to door position switches OA-1, OC-1 and CC-1, shown generally at 34, which provide signals OA, $\overline{OC}$ and $\overline{CC}$, respectively, to a speed pattern VOUT being generated by speed pattern generator 112, to a signal $\overline{HD}$ provided by a heavy door selector function 114, to a slope control function 116 associated with the door safety edge switch 23 and safety switch circuit 70, and also to a signal $\overline{NUDGE}$ provided by door command function 32. Signal $\overline{NUDGE}$ is normally high, i.e., not true. When the door being controlled is a relatively large and heavy door, such as a door at a lobby floor, the characteristics of the speed pattern may be modified to accommodate a larger inertia simply by closing a switch in the heavy door selector 114. When the heavy door selector switch is closed, input line $\overline{HD}$ is connected to a power supply return, such as through an opto-coupler.

When the door 18 has been manually held open for a predetermined period of time, a contact in door command control 32 is closed, forcing signal $\overline{NUDGE}$ low, which selects a predetermined slow closing speed.

Slope control function 116 selects a tailored stopping speed pattern when the door safety edge 23 is actuated to open the associated safety edge contact SS-1.

Figure 5:
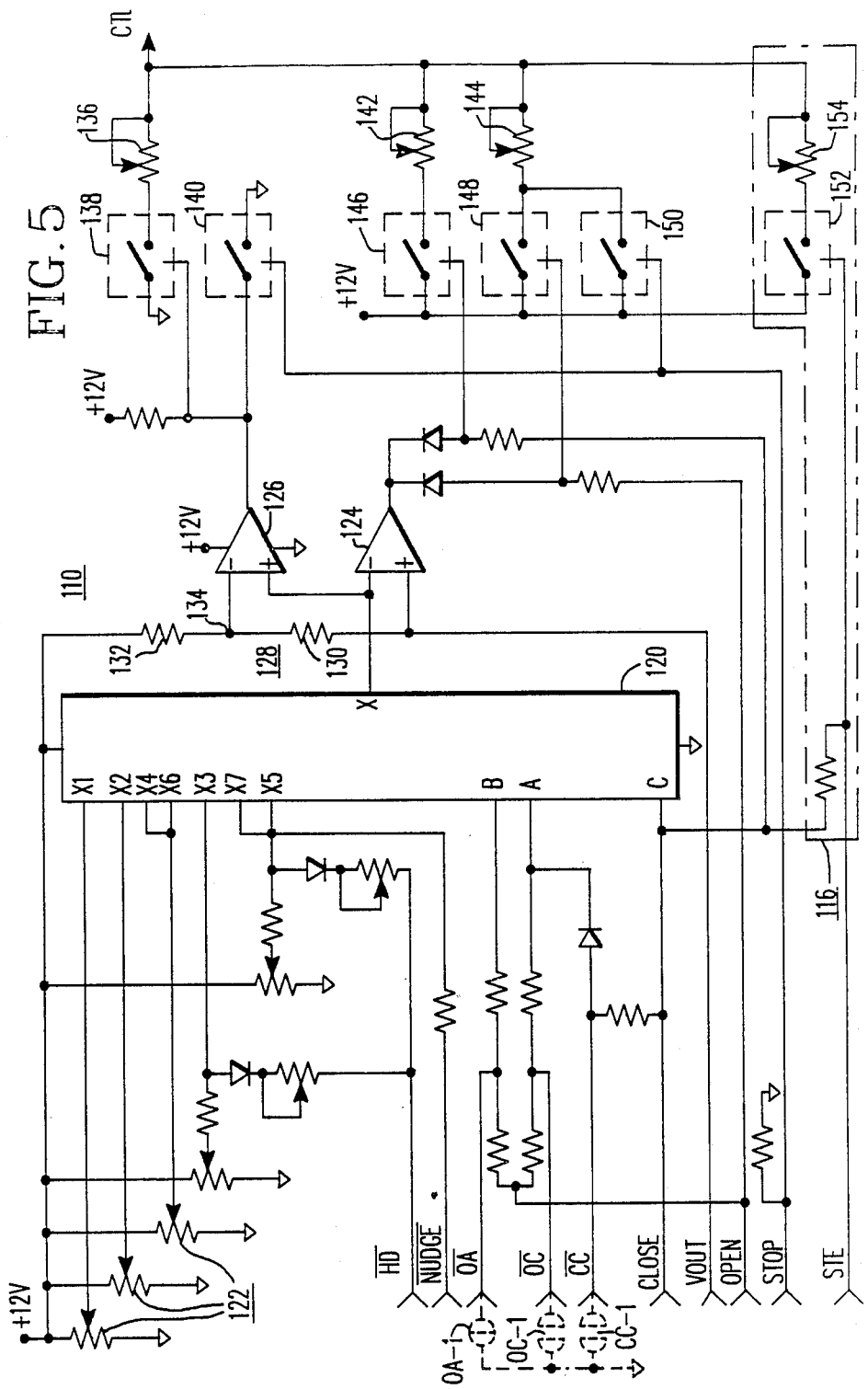
FIG. 5 is a schematic diagram of speed pattern control logic and safety edge slope control which may be used for these functions shown in block form in FIG. 2.
Figure 6:
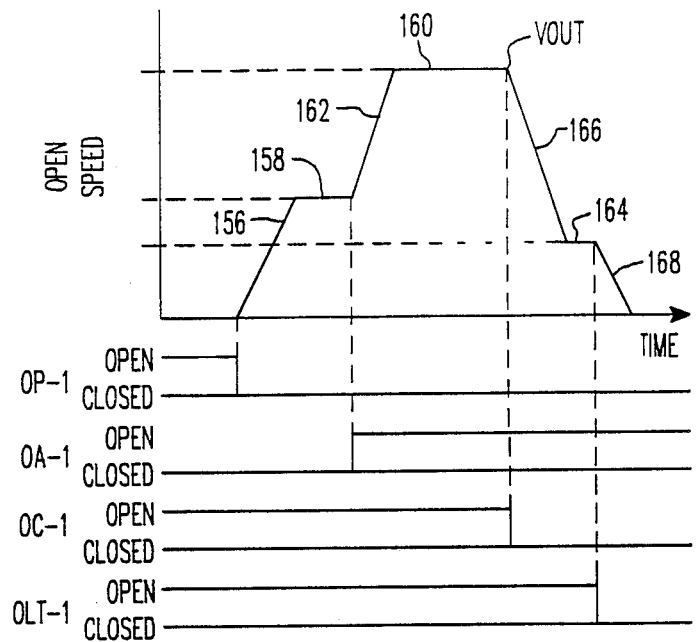
FIG. 6 is a graph which illustrates a door opening speed pattern generated according to the teachings of the invention.
Figure 7:
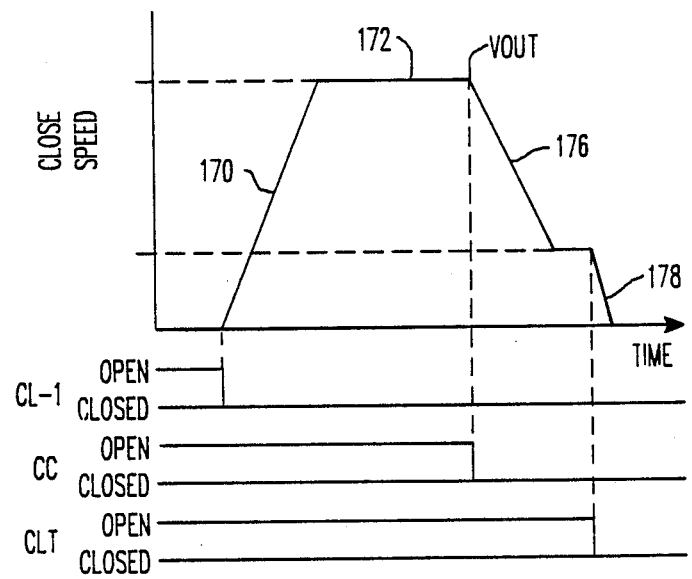
FIG. 7 is a graph which illustrates a door closing speed pattern generated according to the teachings of the invention.

FIG. 5 is a detailed schematic diagram of the speed pattern control logic function 110 and the slope control function 116. FIGS. 6 and 7 will also be referred to, with FIG. 6 illustrating an opening speed pattern and with FIG. 7 illustrating a closing speed pattern. Switches or contacts OP-1, OA-1, OC-1 and OLT-1 control the opening speed pattern, as illustrated in FIG. 6, and switches or contacts CL-1, CC-1 and CLT-1 control the closing speed pattern, as illustrated in FIG. 7. Switches OA-1, OC-1 and CC-1 provide signals OA, $\overline{OC}$ and $\overline{CC}$, respectively, which have true states indicated by current flow through the signal conductor to a power supply return.

The door position switch input signals OA, $\overline{OC}$ and $\overline{CC}$, and the close command signal CLOSE are applied to binary control inputs of an 8 to 1 multiplexer 120, such as RCA's CD4051A. A multiplexer has been chosen to provide target levels for ramping the speed pattern to because of the isolation it provides between the elements utilized to select the levels, compared with a plurality of level detectors which compare predetermined different reference values with the speed pattern. A plurality of potentiometers (pots) 122 are connected to input channels X1 through X7 of multiplexer 120. The binary control inputs A, B and C are decoded to select one of the input channels X1 through X7 to connect to an output X. The decoding takes into account door position, as indicated by door position switches OA-1, OC-1 and CC-1, and it takes into account whether the door is closing or opening according to the logic level of signal CLOSE, to select a speed pattern level for the speed pattern VOUT being generated by the speed pattern generator 112 to ramp to. The speed pattern levels are selectable and adjustable via the potentiometers 122. The level selected by multiplexer 120 at any instant is connected to the inverting input of an op amp 124, and to the non-inverting input of an op amp 126. The speed pattern VOUT being generated is connected to one end of a voltage divider 128 comprising resistors 130 and 132, and the other end of voltage divider 128 is connected to the control voltage +12 volts. The value of resistor 130 is small compared with the value of resistor 132, to enable accurate forcing of the speed pattern in either direction, i.e., to increase it or decrease it according to the comparisons being made by op amps 124 and 126. The non-inverting input of op amp 124 is connected to the end of the voltage divider 128 which is connected to VOUT, and the inverting input of op amp 126 is connected to a junction 134 between resistors 130 and 132.

Control line CTL is responsive to the output of op amp 126 when the pattern VOUT is less than the desired pattern value being output by multiplexer 120, and thus op amp 126, when its output is high, allows the speed pattern value to increase. The rate of increase is controlled by a pot 136. A bilateral switch 138 has its control input connected to be responsive to the output of op amp 126, closing switch 138 to connect pot 136 to ground when the output of op amp 126 switches high. The output of op amp 126 is connected to ground via a bilateral switch 140 which has its control input connected to receive signal STOP. Thus, when signal STOP goes true, op amp 126 cannot function to allow the speed pattern VOUT to increase.

Control line CTL is responsive to the output of op amp 124 when the pattern VOUT is larger than the desired pattern value being output by multiplexer 120, and thus op amp 124, when its output is high, forces the speed pattern value to decrease. The rate of decrease is controlled by a pot 142 when a closing speed pattern is being generated, and by a pot 144 when an opening speed pattern is being generated. A bilateral switch 146 has its control input connected to be responsive to the output of op amp 124 when signal CLOSE is true, closing switch 146 when the output of op amp 124 is high to connect pot 142 to the control voltage +12 volts. Control voltage +12 volts forces the speed pattern to ramp down at a rate selected by pot 142. A bilateral switch 148 has its control input connected to be responsive to the output of op amp 124 when signal OPEN is true, closing switch 148 when the output of op amp 124 is high to connect pot 144 to the control voltage +12 volts. Control voltage +12 volts forces the speed pattern to ramp down at a rate selected by pot 144.

A bilateral switch 150 and a true signal STOP will also cause the speed pattern to ramp down at the rate selected by pot 144.

Referring to FIG. 6, when contact OP-1 closes to signal a door opening command, signal STOP releases op amp 126, and the speed pattern VOUT is allowed to increase along ramp 156 until reaching a relatively low level 158 initially being output by multiplexer 120. This allows the car door 18 to noiselessly engage the hoist door at a relatively low controlled speed, and when door position switch OA-1 closes to signify that the door 18 is in a position where engagement with the hoist door has taken place, multiplexer 120 outputs a new level 160 and the speed pattern ramps upwardly to this level along ramp 162. When a point is reached where deceleration should begin, signified by switch OC-1 closing, multiplexer 120 outputs a new level 164, and the speed pattern VOUT ramps downwardly to this new level along ramp 166. When the door reaches the open limit switch OLT-1, the target level is zeroed, and the speed pattern ramps down to zero speed along ramp 168, enabling door 18 to reach the maximum opening position smoothly, reaching zero speed upon arrival at the limit, assuring vibration-free and quiet operation.

Referring to FIG. 7, when switch CL-1 closes to initiate a door closing command, signal STOP goes low to open bilateral switch 140 and release the speed pattern generator 112 to start along ramp 170 towards lever 172 being initially provided by multiplexer 120. When level 172 is reached the door closing speed pattern remains constant until door 18 reaches the position of switch CC-1, at which time multiplexer 120 outputs a new and lower level 174 to ramp down to along a ramp 176. When level 174 is reached the pattern holds until the close limit switch CLT-1 is reached, which causes multiplexer 120 to output zero as the next target level, causing the speed pattern VOUT to ramp down to zero along ramp 178.

Figure 8:
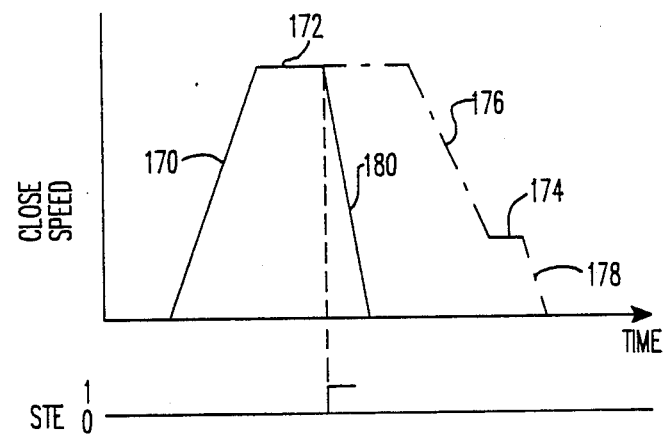
FIG. 8 is a graph which illustrates how the closing speed pattern is modified by an objection-detection stop.

If the door 18 is closing, a true signal STE responsive to actuation of door safety edge 23 causes a bilateral switch 152 located in slope control 116 to close, which forces speed pattern VOUT to ramp down at a rate selected by pot 154, which is also part of the slope control function 116. Thus, independent, selectable control is provided over a safety-edge stop, or a stop initiated by any other object detection device. As shown in the graph of FIG. 8, which illustrates the closing speed pattern shown in FIG. 7, when signal STE goes high the speed pattern is ramped down to zero at a rate selected by pot 154, along a ramp 180 which may be controlled to provide a faster stop than provided by ramp 176, without unduly stressing any mechanical elements.

Figure 9:
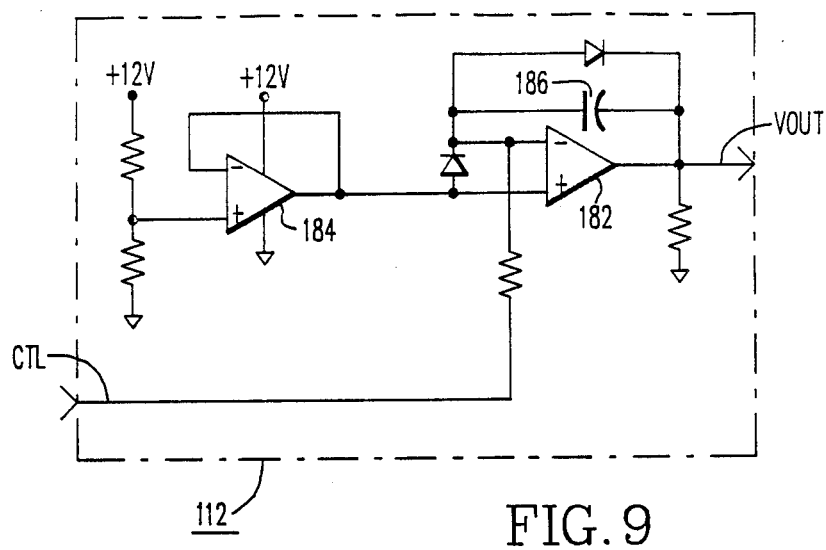
FIG. 9 is a schematic diagram of a speed pattern generator which may be used for that function shown in block form in FIG. 2.

FIG. 9 is a detailed schematic diagram of a ramp generator 112 which may be used to generate the speed pattern VOUT. An op amp 182, connected as an integrator, receives a constant reference voltage from op amp 184. This reference voltage is applied to the non-inverting input of op amp 182. The control line CTL is connected to the inverting input, to control the charge on a feedback capacitor 186 and thus the output level VOUT of op amp 182.

Returning now to FIG. 2, the speed pattern VOUT is compared with the speed of DC motor 35 in an error amplifier 190. In a preferred embodiment of the invention, the armature voltage of DC motor 35 is used as an indication of motor speed, as this is a less costly alternative to using a tachogenerator or a DC motor with very low IR drop. The motor armature voltage is obtained by conductors A and B, and a summing input 192 to error amplifier 190 provides a signal VCOMP. To compensate for the fact that VCOMP must be modified by the motor IR drop to obtain an accurate indication of motor speed, the speed pattern VOUT is modified by a signal IFB which is proportional to the IR drop of motor 35. Signal IFB is obtained by obtaining a signal ISH from power bridge 68 proportional to motor current and applying it to a current feedback sample and hold circuit 194. The resulting comparison of the modified speed pattern signal with the motor armature voltage provides a control signal VCONT for a pulse width modulator (PWM) 196. Pulse width modulator 196 provides output lines UO and UC for controlling a gate circuit 198. Gate circuit 198 provides signals CLUP, OPUP, LPMWC, and LPMWO for controlling power bridge circuit 68.

A dynamic current limit function 200 provides a protective signal DCLT for pulse width modulator 196. Current limit function 200 is responsive to the current feedback signal IFB, the motor speed signal VCOMP, and to the OPEN and CLOSE command signals, providing different current limits for opening and closing, and modifying each current limit according to motor speed. By changing the current limit in response to motor speed, the current limit reference need not be compromised, enabling door 18 to get up to speed faster, to achieve faster door times. This is especially important upon door closing, as the current limit upon door closing is much lower for the door closing operation than it is for opening.

Figure 10:
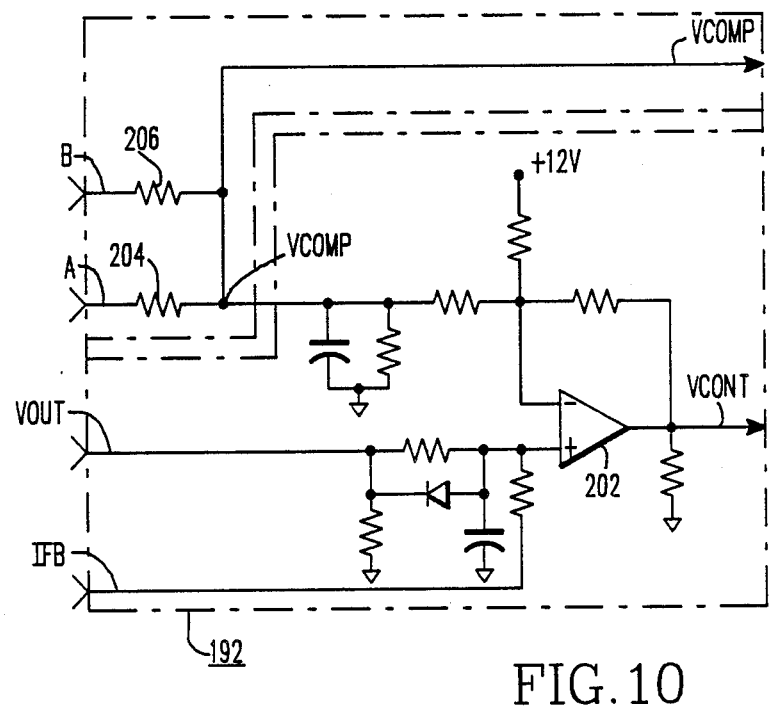
FIG. 10 is a schematic diagram of an error amplifier which may be used for that function shown in block form in FIG. 2.

FIG. 10 is a detailed schematic diagram of error amplifier 190 which provides the control signal VCONT, and of the summing network 192 which provides the door speed signal VCOMP. Error amplifier 190 includes an op amp 202 connected as a summing amplifier. The summing junction 192, which includes resistors 204 and 206, is connected to the inverting input of op amp 202, and the speed pattern VOUT and the signal IFB responsive to motor IR drop are connected to the non-inverting input. The output VCONT of op amp 202 is thus responsive to the difference between the desired speed of motor 35 and the actual motor speed.

Figure 11:
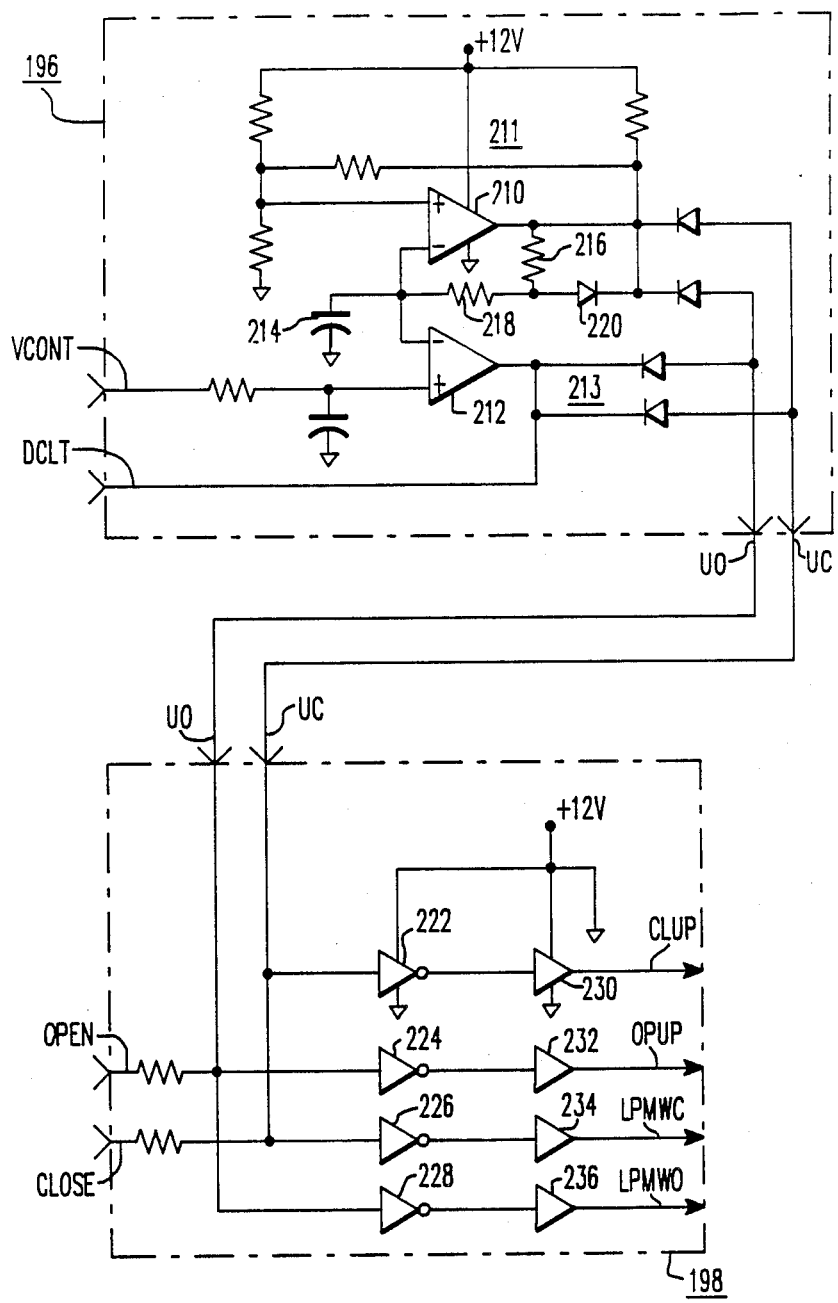
FIG. 11 is a schematic diagram of a pulse width modulator and a gating function which may be used for those functions shown in block form in FIG. 2.

FIG. 11 is a detailed schematic diagram of pulse width modulator 196 and of the gates 198 controlled by the pulse width modulator 196. Pulse width modulator 196 includes an op amp 210 connected as a free running oscillator 211, and an op amp 212 connected as a comparator 213. A capacitor 214 is charged relatively slowly through resistors 216 and 218, with resistor 218 having a low value compared with the value of resistor 216. This RC circuit controls the rate of the positive-going ramp of the sawtooth waveform generated by oscillator 211. Capacitor 214 is discharged rapidly through resistor 218 and a diode 220 to control the rate of the negative going ramp of the sawtooth waveform. The sawtooth waveform provided by oscillator 211 is applied to the inverting input of op amp 212, and VCONT is applied to the non-inverting input.

Gate circuit 198 includes inverter gates 222, 224, 226 and 228, and non-inverting buffers 230, 232, 234 and 236. In the absence of true door open and close commands the inverter gates provide high outputs CLUP, OPUP, LPMWC and LPMWO. When open command signal OPEN goes high, signals CLUP and LPWMC remain high while signals OPUP and LPWMO go low except for the time that pulse width modulator 196 is forcing the inputs to inverter gates 224 and 228 low. Thus, gate signals OPUP and LPMWO go high and low with pulse width modulation. In like manner, when close command signal CLOSE goes high, signals OPUP and LPMWO remain high while signals CLUP and LPMWC go low except for the time that pulse width modulator 196 is forcing the inputs to inverter gates 222 and 226 low.

Figure 12:
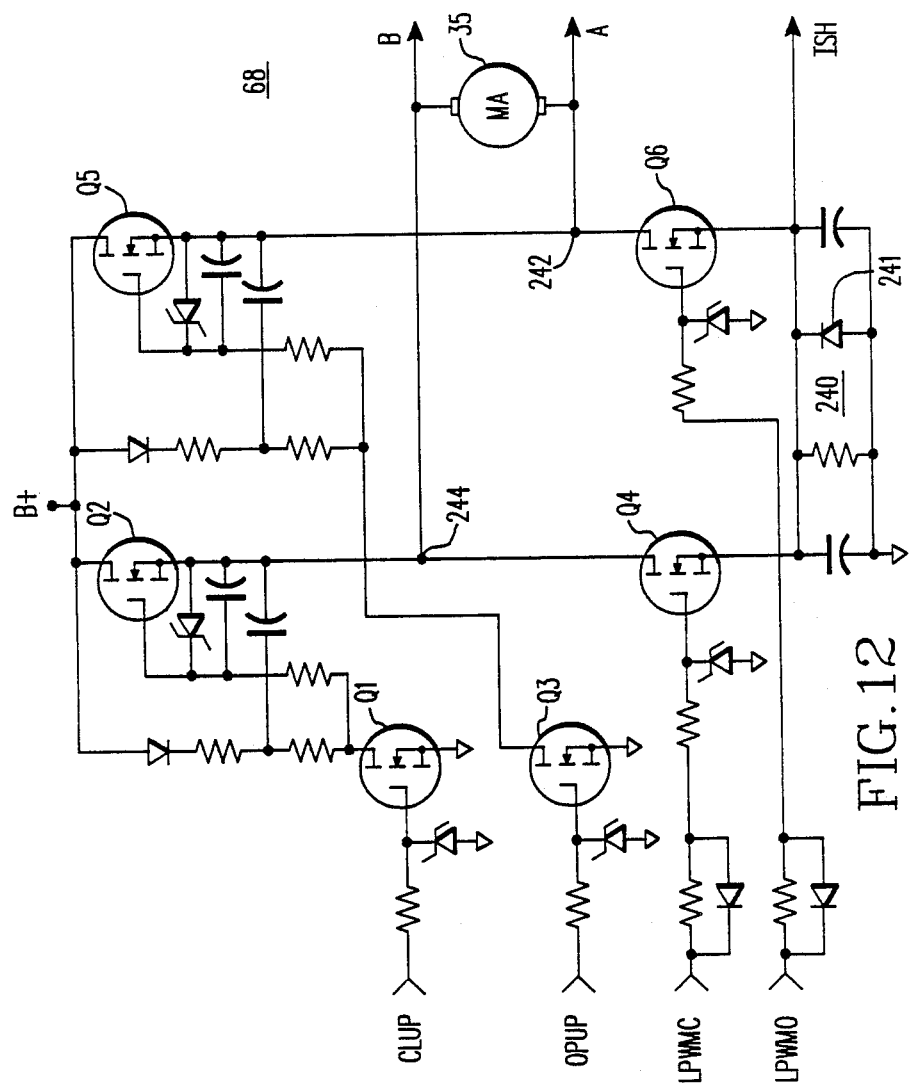
FIG. 12 is a schematic diagram of a power bridge circuit which may be used for that function shown in block form in FIG. 2.

FIG. 12 is a detailed schematic diagram of power bridge circuit 68 which includes six enhancement type, n-channel, insulated gate field effect transistors (MOSFET) Q1 through Q6. MOSFETS Q2, Q4, Q5 and Q6 are connected in a bridge between B+ and power supply ground, with MOSFETS Q2 and Q5 being in the upper arms connected directly to B+ and MOSFETS Q4 and Q6 being in the lower arms connected to power supply ground through a network 240 for developing a voltage ISH proportional to motor current. Signal ISH is proportional to motor armature current only during motoring, which is the only time it is important to limit motor current, and thus the need for a bipolar power supply is eliminated. Diode 241 reduces ISH to the voltage drop across the diode during generating modes. The bridge junctions 242 and 244 are connected to the armature of DC motor 35, and they are also connected to conductors A and B which obtain a measure of the voltage across motor 35. MOSFET Q1 is connected to control MOSFET Q2, and MOSFET Q3 is connected to control MOSFET Q5. Thus, when all of the signals from gate circuit 198 are high, which is the case when there is no true door open or close command, MOSFETS Q1, Q3, Q4 and Q6 are on, while MOSFETS Q2 and Q5 are off. This is a braking mode which brakes the armature of motor 35 and prevents the door from being opened without applying a considerable opening force to the door.

When command OPEN goes true, Q1 and Q4 remain on, and bridge arms Q5 and Q6 alternately turn on and off with underlap, with Q5 being on when Q3 and Q6 are off, and with Q3 and Q6 being on when Q5 is off. Thus, when Q5 is on, current flows from B+ through Q5, through the motor armature 35 from junction 242 to junction 244, through Q4 to power supply ground. When Q5 is off and Q6 is on, current continues to flow through armature 35 through Q4 and Q6, in effect free wheeling through Q6. If operation should change to a reverse power flow quadrant while Q5 is on, i.e., the motoring mode changes to a generating mode, and the charge on capacitors 48 of the power supply 36 will be increased, as hereinbefore explained.

In like manner, when command CLOSE goes true Q3 and Q6 remain on, and bridge arms Q2 and Q4 alternately turn on and off with underlap, with Q2 being on when Q1 and Q4 are off, and with Q1 and Q4 being on when Q2 is off. Thus, when Q2 is on, current flows from B+ through Q2, through the motor armature 35 from junction 244 to junction 242, through Q6 to ground. When Q2 is off and Q4 is on, current continues to flow through armature 35 through Q4 and Q6, free wheeling through Q4. If operation should change to a reverse power flow quadrant while Q2 is on, the charge on capacitors 48 of the power supply 36 will be also increased.

Figure 13:
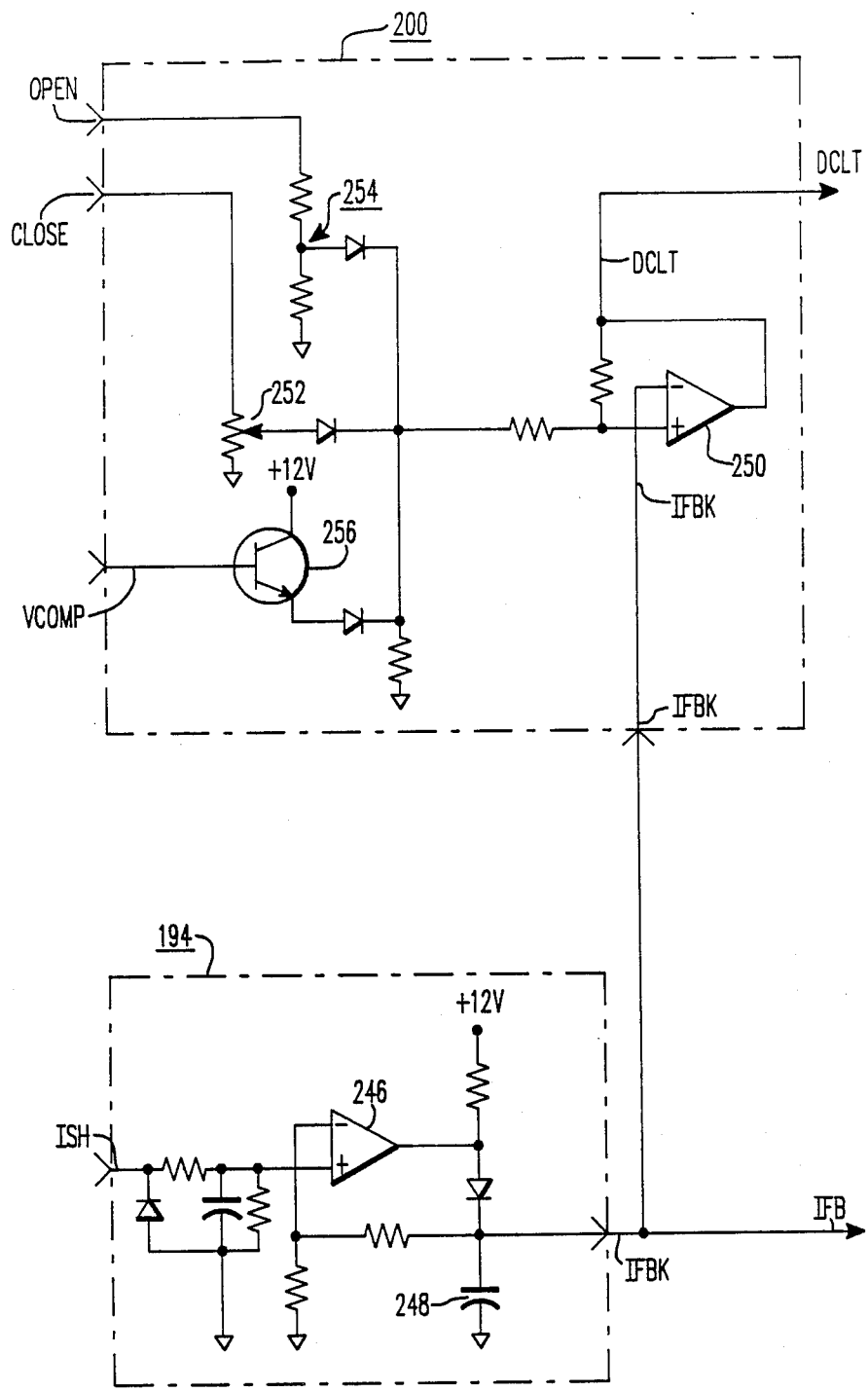
FIG. 13 is a schematic diagram of a current feedback function and a dynamic current reference function which may be used for these functions shown in block form in FIG. 2.

FIG. 13 is a detailed schematic diagram of the current feedback function 194 and the dynamic current limit function 200. The current feedback function 194 receives signal ISH from the power bridge circuit 68 and applies it to the non-inverting input of an op amp 246 connected as a sample-and-hold circuit. The value sampled and held on a capacitor 248 provides the current feedback signal IFB.

Figure 14:
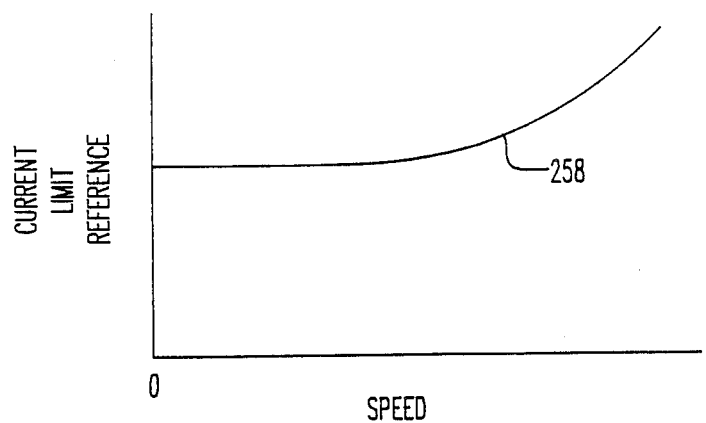
FIG. 14 is a graph which plots the current reference developed by the circuit shown in FIG. 13 versus motor speed, illustrating how the reference increases with increasing motor speed.

The dynamic current limit function 200 includes an op amp 250 which has its inverting input connected to receive the current feedback signal IFB. Thus, the dynamic current limit function 200 is effective only during motoring modes of DC motor 35, as signal IFB is proportional to motor current only during motoring modes. A true door open signal OPEN energizes the non-inverting input of op amp 250 via a pot 252 which sets the current reference level when motor 35 is stationary. A true door close signal CLOSE energizes the non-inverting input via a voltage divider 254. Both the door-close and the door-open current reference levels are modified according to motor speed by an NPN junction transistor 256 which has its base connected to receive signal VCOMP which is proportional to motor speed. As motor speed increases the voltage applied to the non-inverting input increases, thus raising the current reference. FIG. 14 is a graph which plots the current limit reference versus motor speed, illustrating how the reference 258 increases with motor speed. If the motor current rises to the level of the reference at any time, signal DCLT will switch low, shutting down the pulse width modulator 196. During generating modes of DC motor 35, the signal IFB will be close to zero, and thus signal DCLT cannot go low during generating modes.

We claim:

1. In an elevator door control system, including a door, and a door drive motor operable in selected directions to drive the door towards open and closed positions, the improvement comprising:
   motor control means providing a motor control signal for controlling the speed of the motor,
   means providing a speed signal responsive to motor speed,
   means providing a current signal responsive to motor current,
   means responsive to said speed signal for providing a dynamic current limit reference signal,
   and means responsive to said dynamic current limit reference signal and to said current signal for modifying said motor control signal when the motor current signal and the current limit reference signal have a predetermined relationship.

2. The elevator door control system of claim 1 wherein the door drive motor is a DC motor having an armature, and the means providing the speed responsive to motor speed obtains a measure of the voltage across the motor armature.

3. The elevator door control system of claim 1 wherein the door drive motor is a DC motor and the motor control means operates the DC motor in motoring and generating modes, and wherein the means which modifies the motor control signal is effective only when the DC motor is in a motoring mode.

4. The elevator door control system of claim 1 including means for providing door open and close command signals, and wherein the means which provides the dynamic current limit reference signal is additionally responsive to said door command signals, providing first and second different dynamic current reference signals in response to said door open and close command signals, respectively.

5. The elevator door control system of claim 1 including:
   speed pattern means for providing a door closing speed pattern when the door is to close, including a speed pattern portion for decelerating and stopping the door, with the motor control means providing the motor control signal in response to said speed pattern and to the motor control signal,
   detection means for detecting an obstruction in the path of the door when the door is being operated towards the closed position,
   said speed pattern means providing a stopping speed pattern in response to said detection means, parameters of which are selectively controllable independent of the decelerating and stopping portion of the door closing speed pattern.

6. The elevator door control system of claim 1 including:
   means for providing door open and door close command signals,
   and protective means responsive to said command signals and to the motor control signal,
   said protective means communicating said command signals to the motor control means when the motor control signal indicates motor direction may be reversed without adversely affecting the motor control means, and otherwise blocking said command signals from the motor control means.

7. The elevator door control system of claim 6 including:
a power supply for providing a control voltage for the elevator door control system,
means for monitoring said power supply and for providing a predetermined signal when the power supply control voltage exceeds a predetermined minimum value,
and wherein the protective means is further responsive to said power supply monitoring means, blocking the command signals from the motor control means when the predetermined signal is not present.

8. The elevator door control system of claim 1 including:
a power supply for providing a control voltage for the elevator door control system,
means for monitoring said power supply and for providing a predetermined signal when the control voltage exceeds a predetermined minimum value,
switch means,
gating means,
and means for providing door open and close command signals,
said switch means being responsive to the motor control signal, connecting said command signals to the gating means when the motor control signal indicates motor direction may be changed without adversely affecting the motor control means, and otherwise blocking said command signals from said gating means,
said gating means being responsive to the power supply monitoring means, connecting said command signals to the motor control means when the predetermined signal is present, and otherwise blocking said command signals.

9. The elevator door control system of claim 1 wherein the motor is a DC motor, and wherein the motor control means includes:
a power bridge circuit,
a DC power supply including filter capacitors and DC output terminals, with the DC output terminals being connected to said DC motor via said power bridge circuit,
a speed pattern generator for providing a speed pattern signal indicative of desired motor speed,
means responsive to said speed pattern signal and to the motor speed signal for controlling the power bridge circuit to cause said DC motor to function as a motor when the door speed is less than the desired door speed, and as a generator when the actual door speed exceeds the desired door speed,
and impedance means,
said filter capacitors of the DC power supply being charged when the DC motor functions as a generator;
and circuit protective means responsive to the voltage across said filter capacitors for connecting said impedance means across the DC output terminals when the voltage across said filter capacitors reaches a predetermined magnitude.

10. The elevator door control system of claim 1 including a speed pattern generator for providing a speed pattern indicating desired motor speed, and means including a multiplexer for selectively controlling predetermined parameters of said speed pattern.

11. Elevator door control comprising:
a DC motor,
a power bridge circuit,
a DC power supply including filter capacitors and DC output terminals, with the DC output terminals being connected to said DC motor via said power bridge circuit,
a speed pattern generator for providing a speed pattern signal indicative of desired motor speed,
feedback means providing a feedback signal responsive to the speed of the DC motor,
control means responsive to said speed pattern signal and to said feedback signal for controlling the power bridge circuit to cause said DC motor to function as a motor when the door speed is less than the desired door speed, and as a generator when the actual door speed exceeds the desired door speed,
and impedance means,
said filter capacitors of the DC power supply being charged when the DC motor functions as a generator,
and circuit protective means responsive to the voltage across said filter capacitors for connecting said impedance means across the DC output terminals when the voltage across said filter capacitors reaches a predetermined magnitude.

12. In an elevator door control system, including a door, and a door drive motor operable in selected directions to drive the door between open and closed positions, the improvement comprising:
speed pattern means for providing a door closing speed pattern when the door is to close, including a speed pattern portion for decelerating and stopping the door, means for providing a motor speed signal,
control means responsive to said door closing speed pattern and to said motor speed signal for controlling the speed of the motor,
and means for detecting an obstruction in the path of the door when the door is being operated towards the closed position,
said speed pattern means providing a stopping speed pattern in response to said detection means, parameters of which are selectively controllable independent of the deceleration and stopping portion of the door closing speed pattern without modification of the decelerating and stopping portion of the door closing speed pattern.

13. In an elevator door control system, including a door, and a door drive motor operable in selected directions to drive the door towards open and closed positions, the improvement comprising:
motor control means for providing a motor control signal,
means for providing door open and door close command signals,
and protective means responsive to said command signals and to the motor control signal,
said protective means communicating said command signals to the motor control means when the motor control signal indicates that motor direction may be reversed without adversely affecting the motor control means, and otherwise blocking said command signals from the motor control means.

14. In the elevator door control system of claim 13, including:
a power supply for providing a control voltage for the elevator door control system, means for monitoring said power supply and for providing a predetermined signal when the power supply control voltage exceeds a predetermined minimum value, and wherein the protective means is further responsive to said power supply monitoring means, blocking the command signals from the motor control means when the predetermined signal is not present.

15. In an elevator door control system, including a door, and a door drive motor operable in selected directions to drive the door towards open and closed positions, the improvement comprising:
- a DC motor,
- a power bridge circuit for the DC motor,
- motor control means providing a motor control signal for the power bridge circuit,
- a power supply for providing a control voltage for the elevator door control system,
- means for monitoring said power supply and for providing a predetermined signal when the control voltage exceeds a predetermined minimum value,
- switch means,
- gating means,
- and means for providing door open and close command signals,
- said switch means being responsive to the motor control signal, connecting said command signals to the gating means when the motor control signal indicates motor direction may be changed without adversely affecting the power bridge circuit, and otherwise blocking said command signals from said gating means,
- said gating means being responsive to the power supply monitoring means, connecting said command signals to the motor control means when the predetermined signal is present, and otherwise blocking said command signals.

* * * * *